(12) United States Patent
Bjorklund et al.

(10) Patent No.: US 6,558,105 B2
(45) Date of Patent: May 6, 2003

(54) LOAD GATE AND METHOD OF OPERATING A FORWARDER USING THE SAME

(75) Inventors: Lars Bjorklund, Soderhamn (SE); Timothy G. Sidles, Oswego, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 09/691,924

(22) Filed: Nov. 29, 2000

(65) Prior Publication Data

US 2002/0071753 A1 Jun. 13, 2002

(51) Int. Cl.[7] .................................................. B60P 1/48
(52) U.S. Cl. ........................ 414/555; 280/748; 144/4.1
(58) Field of Search .......................... 414/555; 144/4.1; 280/748

(56) References Cited

U.S. PATENT DOCUMENTS 3,913,967 A  * 10/1975 Johnson et al. ............. 296/1 R
4,838,328 A  * 6/1989 Herolf ......................... 144/336
5,338,079 A  * 8/1994 Kuhns ......................... 296/15
6,368,047 B1 * 4/2002 White ........................ 414/555

OTHER PUBLICATIONS

Caterpillar 554 & 574 Forwarders copyright 1999 Caterpillar.

* cited by examiner

Primary Examiner—Steven A. Bratlie
(74) Attorney, Agent, or Firm—Liza J Meyers

(57) ABSTRACT

A preferred embodiment of the present invention provides an apparatus and method of a load gate. A forwarder includes a load gate, a frame, a power source, an operator station, at least one propulsion device, at least one load retaining member, an implement, all of these arranged into a tractor and a trailer. The load gate includes at least one window and at least one transparent pane covering the windows.

7 Claims, 4 Drawing Sheets

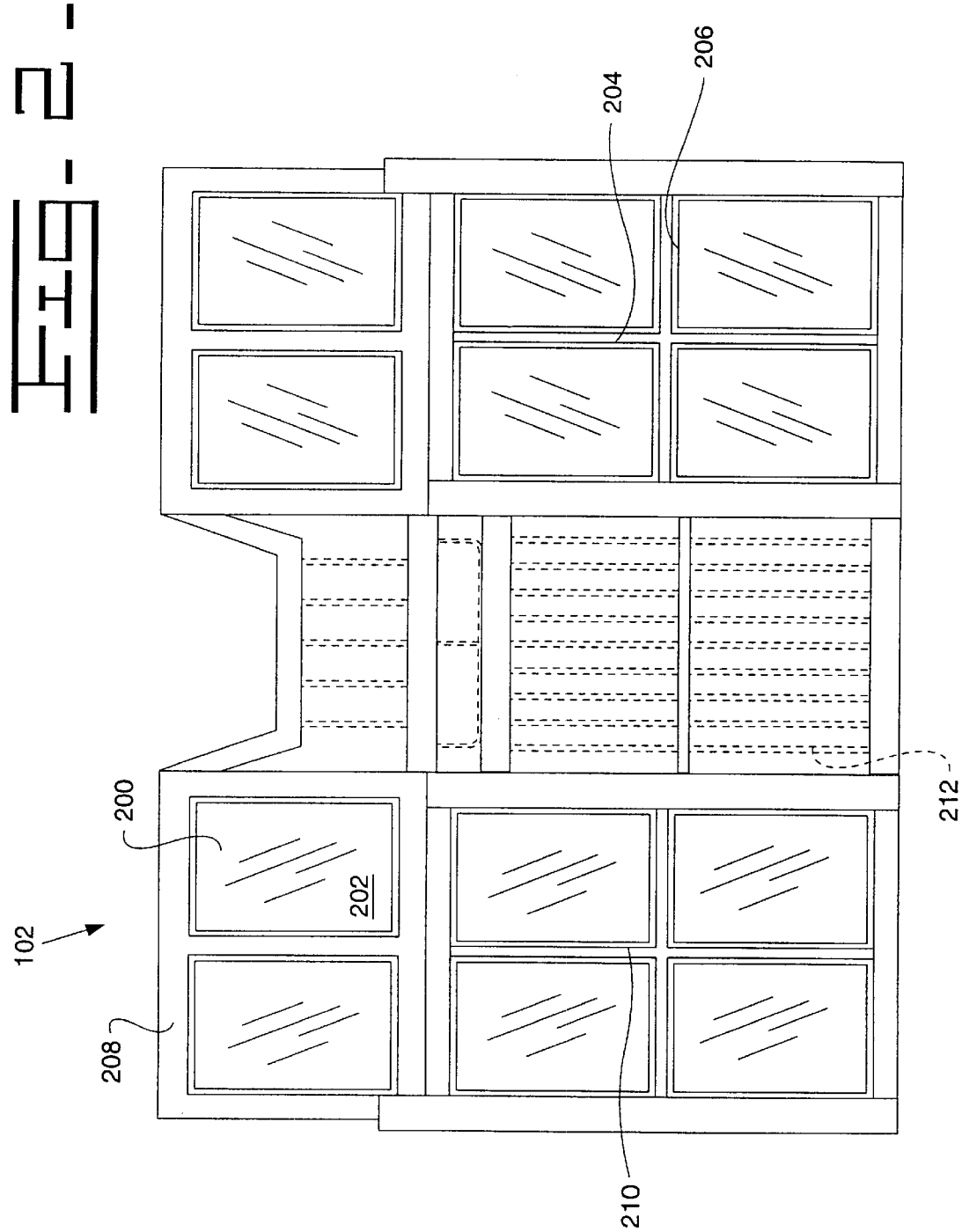

LOAD GATE AND METHOD OF OPERATING A FORWARDER USING THE SAME

TECHNICAL FIELD

This invention relates generally to a load gate, and more particularly, to a load gate for a forwarder that allows an operator an improved view of the load being carried.

BACKGROUND ART

In the forestry industry, it is common for trees to be cut down in the woods and then hauled to a central collection point for further processing. The type of work machine that does the hauling is known as a forwarder. The forwarder has a tractor, including an operator station and a power source, and a trailer, including a work implement, a load gate, and a load-carrying frame. The work implement picks up the logs and stacks them on the load-carrying frame. Optionally, the load-carrying frame can be structured into several bays to allow different types and/or sizes of logs to be sorted out.

The load gate of the forwarder prevents the logs from sliding or being placed such that they are able to contact the implement or the operator station. Commonly, the load gate includes a series of bars to allow the operator to see the load while still preventing the logs from being positioned in an undesirable manner. However, these bars can obstruct the operator's view of the logs. Additionally, the open space between the bars allows debris to pass through, which can cause wear and malfunctioning of components on the tractor and the forward part of the trailer. The bars themselves can be expensive and time-consuming to manufacture and install. Finally, should the bars become bent from contact with the logs or other objects during use, smaller logs may be able to pass therebetween, thus causing the load gate to lose its intended function.

This invention is directed toward overcoming one or more of the problems identified above.

DISCLOSURE OF THE INVENTION

In one embodiment of the present invention, a load gate is disclosed, including a frame having at least one window and at least one transparent pane covering the window.

In another embodiment of the present invention, a method of operating a forwarder is disclosed. The method includes the steps of capturing at least one log with an implement, visually guiding the log to a desired position by viewing a current position of the log through a transparent pane of a load gate and responsively adjusting a position of the implement, and releasing the tree from the implement.

In an embodiment of the present invention, a forwarder adapted to transport logs is disclosed. The forwarder includes a tractor portion and a trailer portion. The tractor portion includes a frame, a power source, an operator station, and at least one propulsion device. The trailer portion includes a frame, a boom carrying an implement, at least one load retaining member, at least one propulsion device, and a load gate. The load gate includes at least one window covered by at least one transparent pane.

BRIEF DESCRIPTION OF THE DRAWINGS

For a better understanding of the invention, reference may be made to the accompanying drawings in which:

FIG. 2 is a frontal view of a preferred embodiment of the present invention;

FIG. 3 is a perspective view of a forwarder including a preferred embodiment of the present invention.

BEST MODE FOR CARRYING OUT THE INVENTION

A preferred embodiment of the present invention provides an apparatus and method of a load gate. The following description uses a forwarder as an example only. This invention may be applied to other types of forestry machines, such as a skidder, log hauler, or harvester.

Figure 1:
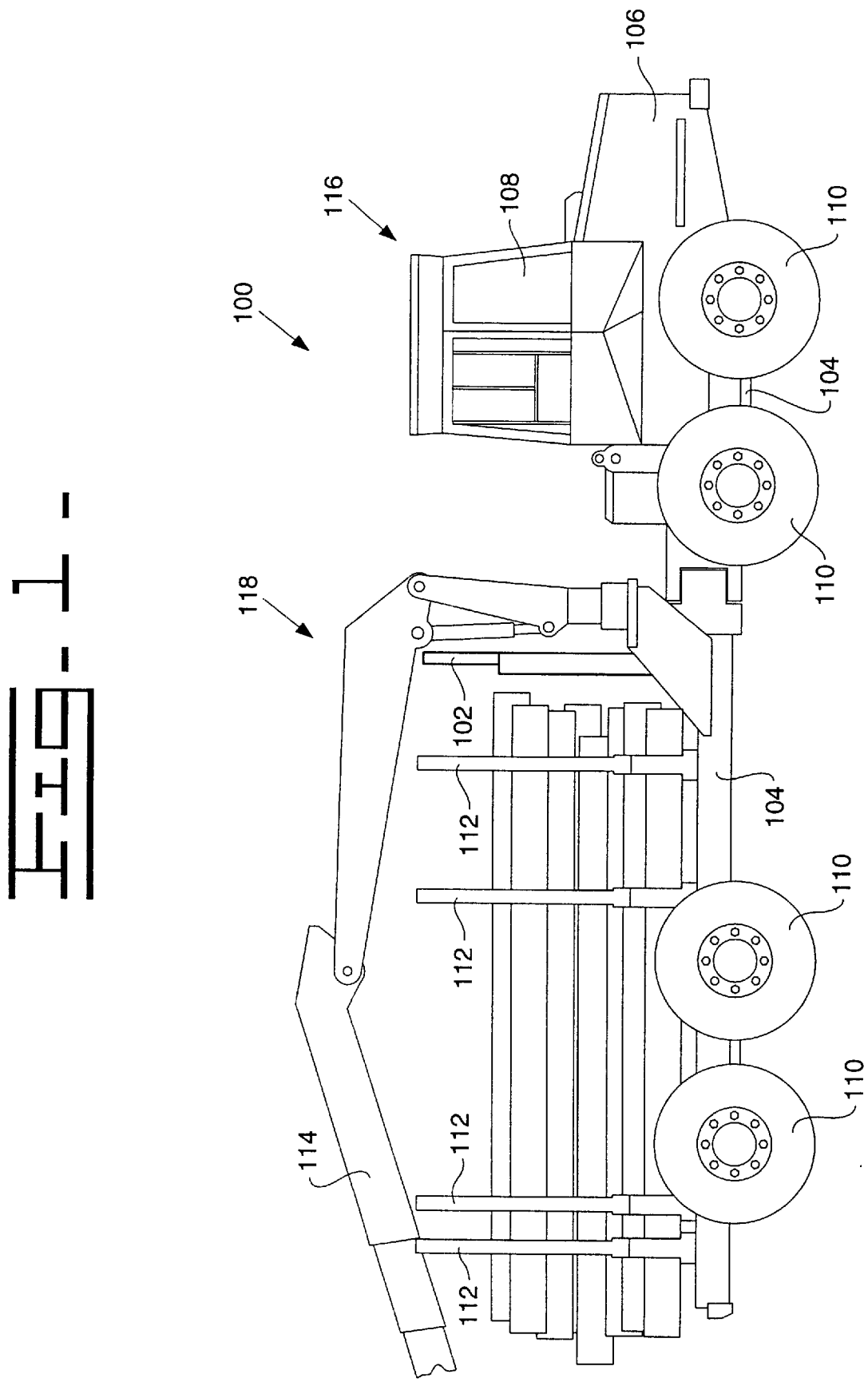
FIG. 1 is a side view of a forwarder including a preferred embodiment of the present invention.
Figure 5:
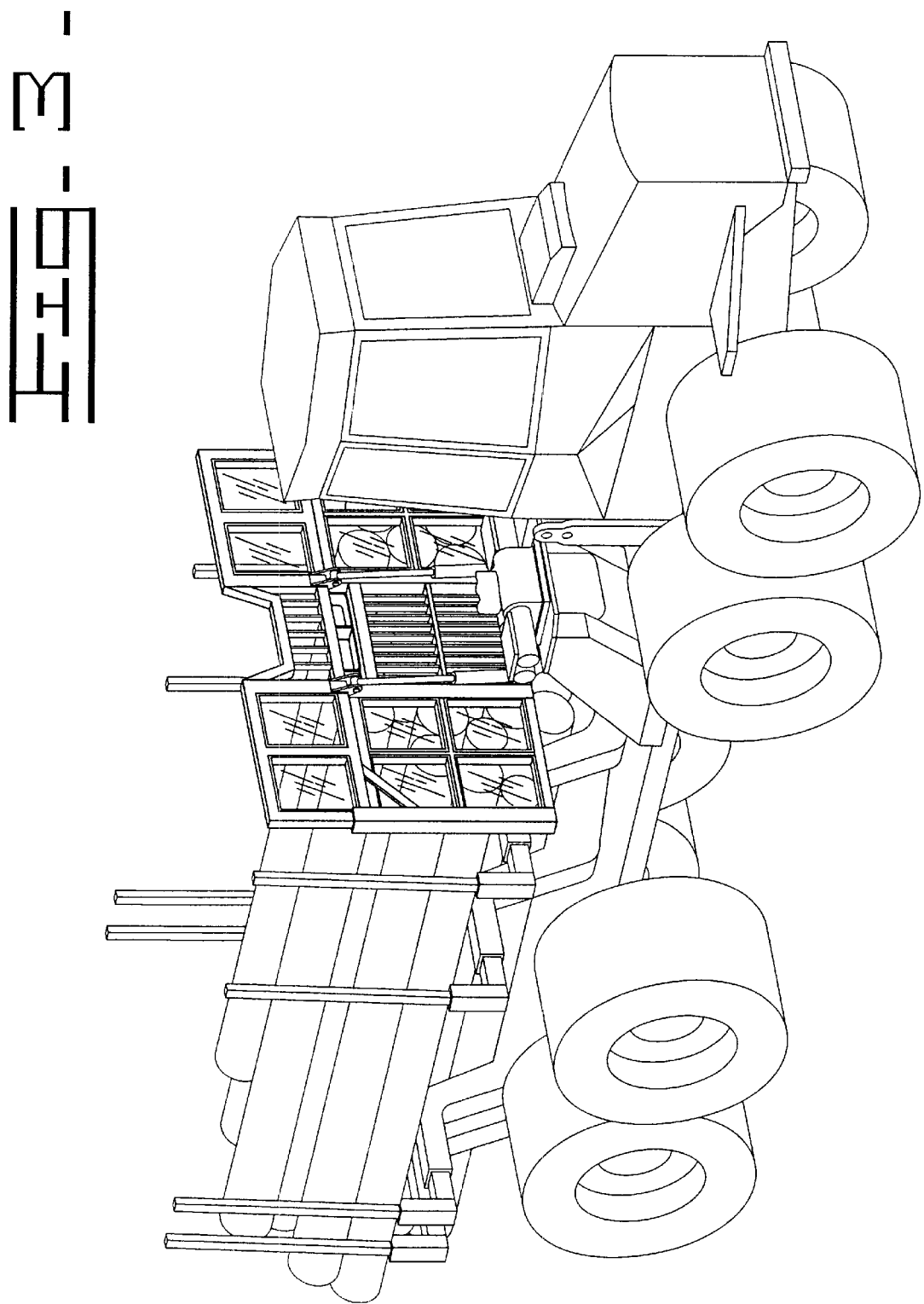

As shown in FIGS. 1 and 3, a forwarder 100 includes a load gate 102, a frame 104, a power source 106 (such as an engine or fuel cell), an operator station 108, at least one propulsion device 110 (such as a wheel/tire, track, or belt), at least one load retaining member 112, an implement 114, all of these arranged into a tractor 116 and a trailer 118. As shown in FIG. 2, the load gate 102 includes at least one window 200 and at least one transparent pane 202 covering the windows 200. By "covering", it is meant that the transparent panes 202 prevent material from passing through the windows 200; the transparent panes 202 may be located wholly within the windows 200, fastened to a portion of the load gate 102 outside the windows 200, or attached in any way which blocks passage through the windows 200 without departing from the scope of the present invention. Additionally, the transparent panes 202 do not have to be imperforate to function as intended in the present invention.

The load gate 102 also includes a plurality of upright members 204 and a plurality of crosspiece members 206. The upright members 204 and crosspiece members 206 cooperatively define the windows 200. Alternatively, an outer frame 208 and inner frame 210 can cooperatively define the windows 200.

Preferably, the transparent panes 202 are made of glass, possibly reinforced with a bonded layer of another material such as wire mesh or plastic; a clear plastic such as, but not limited to, acrylic, PMMA (Plexiglas®), Lexan®, polycarbonate; a wire mesh; or some other substantially transparent material. However, transparent panes 202 made of colored ("smoked"), translucent, or any other materials through which an operator can see a load (not shown) on the forwarder 100 should be considered to be within the scope of the present invention.

Figure 4:
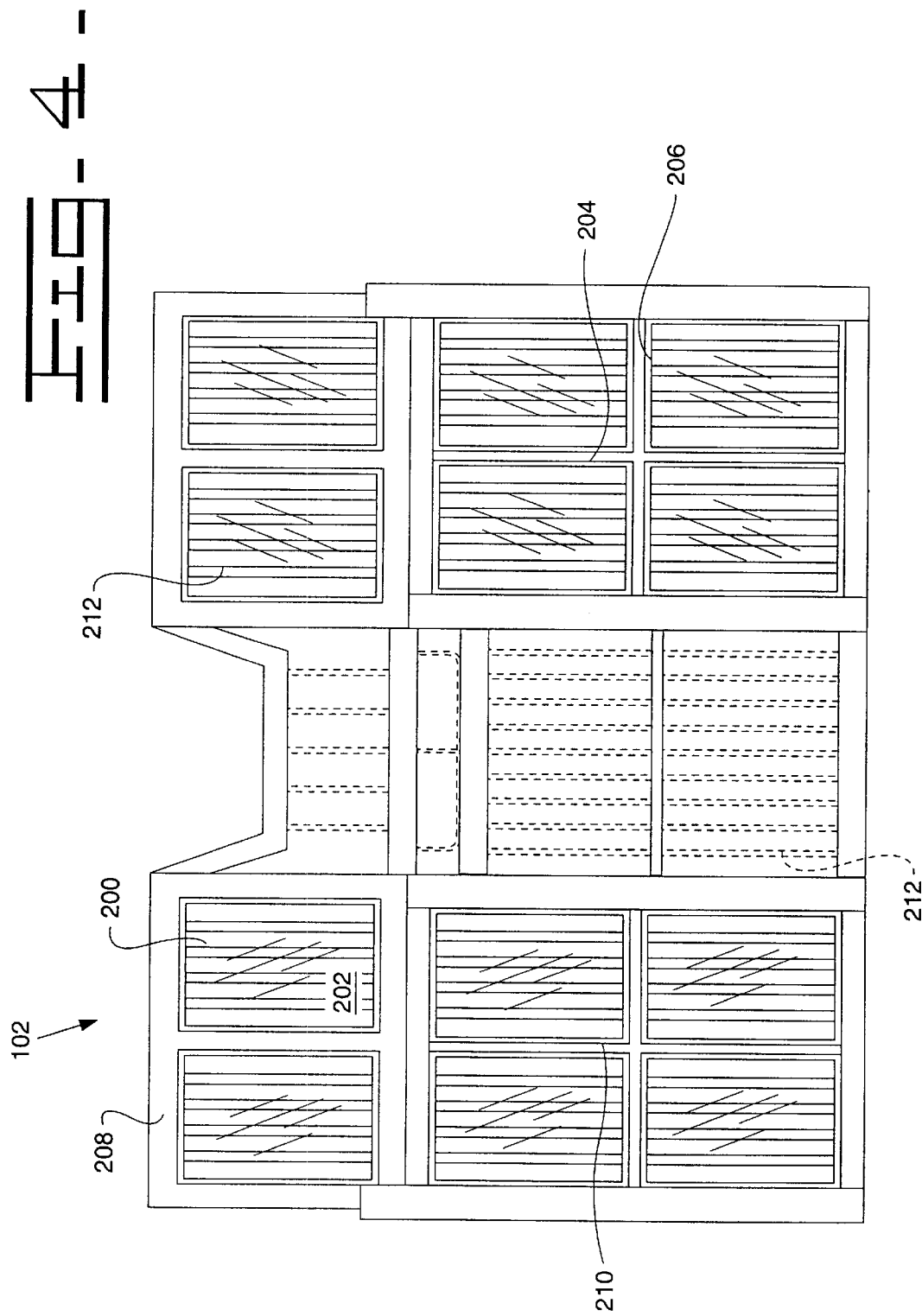
FIG. 4 is a frontal view of a preferred embodiment of the present invention.

Optionally and as shown in FIG. 4, at least one bar 212 may be located within at least one of the windows 200 for reinforcement purposes, either separately or in combination with the transparent panes 202. The bars 212 may also remain after a prior design load gate is retrofitted with the present invention.

Preferably, the transparent panes 202 are operative to allow an operator to have a substantially unobstructed view of the load (not shown) from the operator station 108 through the windows 200.

While aspects of the present invention have been particularly shown and described with reference to the preferred embodiment above, it will be understood by those skilled in the art that various additional embodiments may be contemplated without departing from the scope of the present invention. For example, the material of the transparent panes 202 may differ from those described, one or more bars 212 may be present in any orientation and may possibly have transparent panes 202 therebetween within the windows 200, or the configuration of the forwarder 100 may differ from that shown. However, a device or method incorporating such an embodiment should be understood to fall within the scope of the present invention as determined based upon the claims below and any equivalents thereof.

Industrial Applicability

In a forest environment, a forwarder 100 is used to transport logs or cut trees (not shown) from the harvesting location to a central collection point for further processing. As used herein, "log" is intended to include complete trees and/or tree segments resulting from a cut-to-length process, as well as any other unit of felled tree used in the forestry industry. An operator controls the forwarder 100 to move through the woods to the logs, then operates an implement 114 to pick up the logs.

According to the present invention, the operator picks up the logs, singly or as a bundle, with the implement 114 and then controls the implement 114 to place the logs in a predetermined position on the frame 104 of the trailer 118. The operator looks through the transparent panes 202 covering the windows 200 and adjusts the position of the implement 114 to controllably place the logs into the predetermined position.

When the forwarder 100 has been loaded and driven to the central collection point, the operator reverses the above process to unload the forwarder 100 with the implement 114.

The apparatus and method of certain embodiments of the present invention, when compared with other methods and apparatus, may have the advantages of: preventing debris and logs from passing from the load-carrying frame area; allowing the operator a substantially unobstructed view of the load; the ability be used in a timely and efficient manner; and being more economical to manufacture and use. Such advantages are particularly worthy of incorporating into the design, manufacture, and operation of forwarders. In addition, the present invention may provide other advantages that have not yet been discovered.

It should be understood that while a preferred embodiment is described in connection with a forwarder, the present invention is readily adaptable to provide similar functions for other work machines. Other aspects, objects, and advantages of the present invention can be obtained from a study of the drawings, the disclosure, and the appended claims.

What is claimed is:

1. A method of operating a forwarder, comprising the steps of:

capturing at least one log with an implement;

visually guiding the log to a desired position by viewing a current position of the log through transparent panes covering a plurality of windows in a load gate and responsively adjusting a position of the implement; and releasing the log from the implement.

2. A forwarder adapted to transport logs, comprising:

a tractor portion comprising a frame, a power source, an operator station, and at least one propulsion device; and a trailer portion comprising a frame, a boom carrying an implement, at least one load retaining member, at least one propulsion device, and a load gate, the load gate comprising a plurality of windows and a plurality of transparent panes covering the windows.

3. The forwarder, as set forth in claim 2, wherein the load gate further comprises an outer frame and an inner frame, the outer and inner frames cooperatively defining the windows therebetween.

4. The forwarder, as set forth in claim 2, further comprising:

a plurality of upright members and a plurality of crosspiece members, the upright members and crosspiece members cooperatively defining the windows.

5. The forwarder, as set forth in claim 2, wherein the transparent panes are made from a material chosen from the group consisting of glass, plastic, mesh, and polycarbonate.

6. The forwarder, as set forth in claim 2, wherein at least one bar is located within at least one window.

7. The forwarder, as set forth in claim 2, wherein the transparent panes are operative to allow an operator to have a substantially unobstructed view from the operator station through the windows to see the logs.

* * * * *